Patented Feb. 25, 1947

2,416,309

UNITED STATES PATENT OFFICE 2,416,309

ALKYLAMINE SALTS OF DINITROPHENOLS

John N. Hansen and Frank B. Smith, Midland, Mich., assignors to The Dow Chemical Company, Midland, Mich., a corporation of Michigan No Drawing. Application August 29, 1941, Serial No. 408,812

7 Claims. (Cl. 260—567.6)

The present invention relates to alkylamine salts of nitro-phenols and to parasiticidal compositions in which they are employed as active toxicants. The compounds with which the invention is particularly concerned are the addition salts of the dinitro-phenols and alkylamines having the following formula:

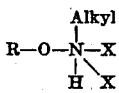

wherein each X is selected from the group consisting of hydrogen and alkyl radicals, —O—R represents an aromatic-oxy radical of the benzene series characterized by having the oxygen directly attached to the benzene nucleus and by a total of 2 nitro groups attached to the oxygenated benzene nucleus, and in which the total number of carbon atoms in the alkyl groups attached to the ammonium nitrogen is at least 3. The preferred alkyl substituents in this formula are those containing from 3 to 12 carbon atoms, inclusive.

We have prepared representative members of the above identified group of compounds and found them to be crystalline solids yellow to orange-red in color, somewhat soluble in certain organic solvents, insoluble in others, and relatively insoluble in water. These compounds are stable to light and air, not appreciably affected by carbon dioxide, and non-corrosive to the skin of humans and higher animals.

The new compounds are prepared by reacting a suitable amine compound such as tri-butylamine, di-n-propylamine, monobutylamine, diamylamine, octylamine, dodecylamine, etc., with a dinitro-phenol. Substantially equimolecular proportions of the dinitro-phenols and amine have been found to give the desired salts in good yield, although any suitable amounts may be employed. Where an excess of one or the other reactant is present, purification is readily accomplished by extraction of the crude salt product with benzene or other selective solvent for the dinitro-phenol and amine or for the amine salt. In most instances, however, the crude reaction product consisting essentially of the amine salt is adapted to be employed as a parasiticidal toxicant without further treatment. An alternate procedure comprises reacting an inorganic phenolate such as sodium 2.4-dinitro-6-cyclohexyl phenolate with a suitable amine hydrohalide such as trimethylamine hydrochloride.

A preferred method of operation comprises carrying out the reaction in the presence of an organic solvent such as benzene, chlorobenzene, toluene, or alcohol. The operating temperatures are not critical, although reduced amounts of solvents are required when the reaction is carried out at somewhat elevated temperatures, e. g., between about 40° and 120° C. and conveniently at the refluxing temperature of the reaction mixture. While the reactants and solvent may simply be mixed together, it is generally convenient to add one reactant to a solution of the other in the selected solvent. Following completion of the reaction, the mixture is filtered, evaporated to dryness, diluted with water, or otherwise manipulated to separate out the desired amine salt compound.

A preferred group of amine salts falling within the scope of the present invention has the following formula:

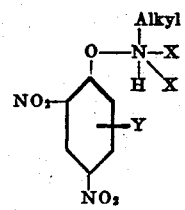

wherein each X is selected from the group consisting of hydrogen and alkyl radicals, Y is selected from the group consisting of alkyl, cycloalkyl, aralkyl, and aryl radicals, and the total number of carbon atoms in the alkyl groups attached to the ammonium nitrogen is at least 3. These compounds are particularly valuable for use in insecticidal and fungicidal compositions because of their exceptionally low solubility in water and their compatibility with other common parasiticidal toxicants.

It has been found that the alkylamine salts of dinitro-phenols are valuable as parasiticidal toxicants and may be appled to growing vegetation in the amounts required to control infestations of many mite, insect, and fungous pests without materially injuring the host plant. The new compounds may be employed as constituents of parasiticidal concentrates or incorporated directly into dust or spray compositions. For example, the toxicants may be compounded with carriers such as diatomaceous earth, bentonite, talc, sulfur, wood flours, inorganic phosphates, and gypsum, to form agricultural dusting compositions. By employing high concentrations of the salts in these dusts, compositions are obtained which may be employed as concentrates and thereafter diluted with additional solid carriers or suspended in water or other inert liquid carrier to form sprays. The alkylamine addition salts may be incorporated with various wetting, dispersing, and sticking agents, and subsequently diluted to produce either dust or spray compositions in which the amine salt is present in any desired concentration. They may also be incorporated in other standard type insecticidal and fungicidal compositions either as the sole toxic ingredient of such composition or in combination with inorganic pigments, organic dyes, pyrethrum, rotenone, cryolite, organic thiocyanates, oils, sulfur, arsenates, copper salts, and related parasiticidal toxicants.

In the preparation of concentrates, from about 5 to about 80 per cent by weight of the alkylamine addition salt is commonly employed. The preferred amounts incorporated in spray or dust compositions for application to living plants is between about 0.01 and 5 per cent by weight. The particular type of composition in which the amine salt is employed and the concentration thereof applied to the plant are dependent upon the type of insect or fungus to be controlled, the circumstances under which such control is to be accomplished, and the tolerance of the host plant.

In a representative composition employed in determining the comparative toxicities of a number of the alkylamine salts of the dinitro-phenols, 18.2 parts by weight of the amine salt, 72.7 parts of diatomaceous earth, and 9.1 parts of sodium lauryl sulfate were ground together to form a dust product adapted to be dispersed by stirring with water. Throughout the following examples compositions of this formula are referred to as "standard test concentrates."

The following examples set forth specific embodiments of the invention but are not to be construed as limiting the same.

*Example 1*

53.2 grams of 2.4-dinitro-6-cyclohexyl-phenol was dissolved in 75 milliliters of hot ethyl alcohol, 25.8 grams of n-octylamine added portionwise to the mixture with stirring and the reaction completed at the boiling temperature of the alcohol and under reflux. The mixture was then cooled and filtered to obtain 50 grams of the n-octylamine salt of 2.4-dinitro-6-cyclohexyl-phenol as an orange crystalline solid. When recrystallized from methyl alcohol, this compound had a melting point of 160°–161.5° C., was soluble in ethyl alcohol, slightly soluble in carbon tetrachloride, and insoluble in petroleum distillate. A saturated water solution at 26° C. had a pH of 6.0 and contained 0.0052 gram of dissolved amine salt per 100 milliliters of solution.

A portion of this product was made up into a standard test concentrate. A spray comprising sufficient of this concentrate to give a concentration of 0.5 pound of the amine salt per 100 gallons, gave kills against cabbage worm, Colorado potato beetle larvae, tent caterpillar larvae, fall webb worm, and red spider of 80, 100, 100, 85, and 100 per cent, respectively.

A further composition was prepared by grinding together 18.2 parts by weight of n-octylamine salt of 2.4-dinitro-6-cyclohexyl-phenol, 70.9 parts of diatomaceous earth, 1.8 parts of linseed oil, and 9.1 parts of sodium lauryl sulfate. When applied at the rate of 0.5 part by weight of toxicant per 100 gallons of aqueous spray, this composition gave a 100 per cent kill on cabbage worms.

*Example 2*

26.6 grams of 2.4-dinitro-6-cyclohexyl-phenol and 18.5 grams of dodecylamine were reacted together in 75 milliliters of hot methyl alcohol substantially as described in the preceding example. The mixture was cooled, filtered, and the residue washed with cold methyl alcohol to obtain 16.5 grams of the dodecylamine salt of 2.4-dinitro-6-cyclohexyl phenol as a yellow crystalline compound melting at 162.5°–164° C. when recrystallized from methyl alcohol.

A standard test concentrate comprising this salt was diluted with water to give a concentration of 0.5 per cent of the amine salt per 100 gallons. This spray gave a kill of 98 per cent of Colorado potato beetle larvae in field tests. A dilute aqueous spray comprising 0.25 pound of the amine salt per 100 gallons gave a kill against red spider of 100 per cent on bean foliage.

*Example 3*

26.5 grams of 2.4-dinitro-6-cyclohexyl-phenol was dissolved in 25 milliliters of boiling benzene. 13 grams of di-n-butylamine was dissolved in 10 milliliters of benzene and added portionwise to the phenol solution with stirring. Considerable heat of reaction was evolved by the mixture. The benzene solution was thereafter cooled and 31.4 grams of the crystalline amine salt recovered by filtration. The di-n-butylamine salt of 2.4-dinitro-6-cyclohexyl-phenol is a red-orange crystalline product melting at 123°–124° C., and soluble in water at 25° C. to the extent of 0.016 gram per 100 milliliters.

A standard test concentrate comprising the above compound was diluted with sufficient water to give a spray composition comprising 0.5 pound of the salt per 100 gallons. This spray gave kills against cabbage worm and Colorado potato beetle larvae of 60 per cent and 97 per cent, respectively. An aqueous spray comprising sufficient of the concentrate to give a concentration of 0.25 pound of the amine salt per 100 gallons was applied to beans infested with red spider and gave a kill of 100 per cent of the parasites.

*Example 4*

26.6 grams of 2.4-dinitro-6-cyclohexyl-phenol and 8.7 grams of mixed monoamylamines were reacted together in 30 milliliters of hot benzene in the usual manner. The crude reaction product was washed three times with cold benzene and dried to obtain 29 grams of the amylamine salt of 2.4-dinitro-6-cyclohexyl-phenol as a yellow crystalline compound melting at 184°–186° C. A saturated water solution contained 0.049 gram of the salt per 100 milliliters of solution at 25° C.

*Example 5*

In a similar manner 26.6 grams of 2.4-dinitro-6-cyclohexyl-phenol and 15.7 grams of mixed diamylamines were reacted together in hot benzene. The crude reaction mixture was diluted with petroleum ether and cooled. The resulting crystalline precipitate was recovered by filtration to obtain a diamylamine salt of 2.4-dinitro-6-cyclohexyl-phenol product in the form of orange, sticky crystals melting at 86°–96° C. This product was soluble in water to the extent of 0.0113 gram per 100 milliliters at 25° C.

*Example 6*

18.4 grams of 2.4-dinitro-phenol was dissolved in 50 milliliters of 95 per cent ethyl alcohol and 19 grams of 82 per cent n-decylamine dissolved in 10 milliliters of benzene added portionwise thereto at the refluxing temperature of the mixture. After the addition of the amine was completed, a portion of the solvent was distilled off and the residue cooled. The resulting crystalline precipitate was separated by filtration and dried under vacuum to obtain 36.5 grams of n-decylamine salt of 2.4-dinitro-phenol as a yellow-brown crystalline product softening at 92° C. and melting at 101° C. This compound was soluble in 95 per cent ethyl alcohol, slightly soluble in carbon tetrachloride, and substantially insoluble in petroleum oil. A saturated water solution at 26° C. had a pH of 7.1 and contained 0.26 gram of the amine salt per 100 milliliters of solution.

Example 7

In a similar manner 26.6 grams of 2.4-dinitro-6-cyclohexyl-phenol and 20.2 grams of 82.8 per cent n-decylamine were reacted together in a mixture of ethanol and benzene to obtain 33.5 grams of the n-decylamine salt of 2.4-dinitro-6-cyclohexyl-phenol as orange crystals softening at 154° C. and melting at 159.2° C. This compound was soluble in 95 per cent ethyl alcohol, slightly soluble in carbon tetrachloride and substantially insoluble in petroleum distillate. A saturated water solution at 26° C. had a pH of 7.4 and contained 0.0132 gram of the salt per 100 milliliters of solution.

A standard test concentrate comprising the above compound was diluted with sufficient water to give a spray composition comprising 0.5 pound of the toxicant per 100 gallons. This spray gave a 100 per cent kill against Colorado potato beetle larvae and 75 per cent against tent caterpillar.

A related composition comprising 16.6 parts by weight of the n-decylamine salt, 66 parts of diatomaceous earth and 16.6 parts of sodium lauryl sulfate was diluted with water to give a concentration of 0.25 pound of the toxicant per 100 gallons. This spray, when applied to beans infested with red spiders, gave a kill of 98 per cent of the parasites.

Example 8

19.8 grams of 2.4-dinitro-6-methyl-phenol was dissolved in 60 milliliters of 95 per cent ethyl alcohol. 15.8 grams of 81.3 per cent n-octylamine was added portionwise to the solution at the boiling temperature of the mixture. Heating and stirring were continued until the major portion of the solvent was evaporated and the mixture thereafter cooled. The resulting crystalline precipitate was recovered by filtration and dried under vacuum at room temperature. 34.5 grams of an n-octylamine salt of 2.4-dinitro-6-methyl-phenol product was thereby obtained as a yellow crystalline product melting at 65°–86° C. This product was soluble in 95 per cent ethyl alcohol, slightly soluble in carbon tetrachloride, substantially insoluble in petroleum distillate, and soluble in water to the extent of 0.031 gram per 100 milliliters of 26° C. The pH of the saturated water solution was 4.5. An aqueous dispersion comprising 0.5 pound of this amine salt per 100 gallons gave a kill against Colorado potato beetle larvae of 65 per cent.

Example 9

26.6 grams of 2.4-dinitro-6-cyclohexyl-phenol was dissolved in 40 milliliters of benzene and 18.5 grams of tri-n-butylamine added thereto. Considerable heat of reaction was evolved whereby the temperature of the reaction mixture rose to approximately 50°–60° C. The mixture was stirred and thereafter cooled to room temperature and filtered. The residue from the filtration was washed with cold benzene to obtain 29 grams of the tri-n-butylamine salt of 2.4-dinitro-6-cyclohexyl-phenol as a yellow crystalline compound melting at 65°–68° C. This compound was soluble in water to the extent of 0.0025 gram per 100 milliliters at 25° C. The saturated water solution had a pH of 6.3.

Example 10

10 parts by weight of the n-octylamine salt of 2.4-dinitro-6-methyl-phenol was ground with 990 parts of pyrophyllite. The resulting fungicidal composition was dusted in such fashion as to obtain a deposit of 0.04995 milligram dust per square centimeter per second during an exposure period of 30 seconds upon mature colonies of Fomes annosus grown on malt agar. In 12 replications a per cent growth inhibition of 100 was obtained.

In a similar determination with a composition comprising 1 per cent by weight of the decylamine salt of 2.4-dinitro-phenol, the average of eleven applications was 90 per cent growth inhibition against Fomes annosus.

By substituting other alkylamine salts of dinitrophenols for those shown in the examples, compositions of comparable utility may be obtained. Representative of the compounds which may be so employed are the salts obtained by reacting di-ethylamine, N-methyl-N-hexylamine, isopropylamine, N-octyl-dimethylamine, tertiary-butylamine, di-octylamine, n-hexylamine, tri-amylamine, etc., with such phenols as 2.4-dinitro-6-normal-octyl-phenol, 2.4-dinitro-6-n-hexyl-phenol, 2.4-dinitro-6-methoxy-phenol, 2.5-dinitro-4-cyclohexyl-phenol, 2.4-dinitro-5-cyclohexyl-phenol, 2.4-dinitro-6-(4-tertiary-butyl-cyclohexyl)-phenol, 2.4-dinitro-6-phenyl-phenol, 2.4-dinitro-6-(4-tertiary-butyl-phenyl)-phenol, 2.4-dinitro-6-phenylethyl-phenol, 2.6-dinitro-4-methyl-phenol 2.4-dinitro-5-anilino-phenol, and dinitro-carvacrol.

The expression "of the benzene series" as applied to the dinitro-phenols and aryl and aromatic-oxy radicals in certain of the following claims is limited in scope to compounds and radicals embodying the phenyl radical and homologues and analogues thereof such as alkyl-phenyl, cycloalkyl-phenyl, alkylcycloalkyl-phenyl, aralkyl-phenyl, polyalkyl-phenyl, aryl-phenyl, alkoxy-phenyl, etc., and is exclusive of such condensed polynuclear radicals as naphthyl, anthranyl, etc.

We claim:

1. The normal octylamine salt of 2.4-dinitro-6-cyclohexyl-phenol.

2. A compound having the formula

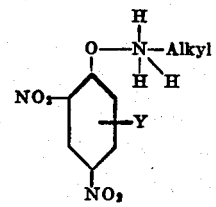

wherein Y is selected from the group consisting of alkyl, cycloalkyl, aralkyl, and aryl radicals, and the alkyl radical attached to the ammonium nitrogen contains from 3 to 12 carbon atoms, inclusive.

3. A compound having the formula

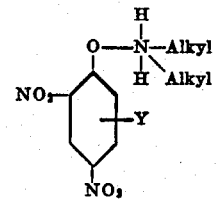

wherein Y is selected from the group consisting of alkyl, cycloalkyl, aralkyl and aryl radicals, and each of the alkyl radicals attached to the ammonium nitrogen contains from 3 to 12 carbon atoms, inclusive.

4. A compound having the formula

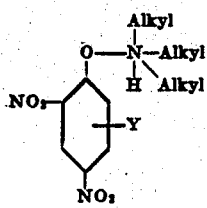

wherein Y is selected from the group consisting of alkyl, cycloalkyl, aralkyl, and aryl radicals, and each of the alkyl radicals attached to the ammonium nitrogen contains from 3 to 12 carbon atoms, inclusive.

5. A compound having the formula

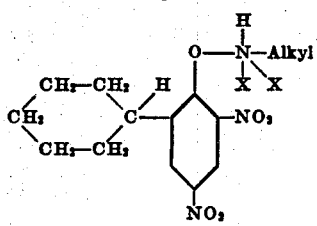

wherein each X is selected from the group consisting of hydrogen and alkyl radicals, and the total number of carbon atoms in the alkyl radicals attached to the ammonium nitrogen is at least 3.

6. A parasiticidal composition comprising as a toxic ingredient a compound having the formula

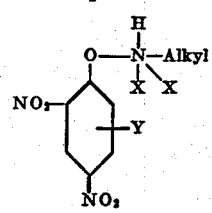

wherein Y represents a member of the group consisting of alkyl, cycloalkyl, aralkyl, and aryl radicals, each X is selected from the group consisting of hydrogen and alkyl radicals, and the total number of carbon atoms in the alkyl radicals attached to the ammonium nitrogen is at least 3, in intimate mixture with a carrier.

7. A compound having the formula

wherein each X is selected from the group consisting of hydrogen and alkyl radicals, —O—R represents an aromatic-oxy radical derived from a monohydric nitrophenol and characterized by having the oxygen directly attached to the benzene nucleus, and by a total of two nitro groups attached to the oxygenated benzene nucleus, and the total number of carbon atoms in the alkyl groups attached to the ammonium nitrogen is at least 3.

JOHN N. HANSEN.
FRANK B. SMITH.

REFERENCES CITED

The following references are of record in the file of this patent:

UNITED STATES PATENTS

| Number | Name | Date |
|---|---|---|
| 1,880,404 | Britton et al. | Oct. 4, 1932 |
| 2,222,486 | Moore | Nov. 19, 1940 |
| 2,225,618 | Britton et al. | Dec. 24, 1940 |

OTHER REFERENCES

Hoogewerff, in "Recueil Trav. Chim Pays Bas," vol. 6, p. 387.

Chancel, in "Bull. Soc. Chem de France," series 3, vol. 7, p. 406.

Jerusalem, in "Jour. Chem. Soc.," London, vol. 95, p. 1281.